June 21, 1960
J. J. SOCHOR
2,941,619
PROCESS OF AND APPARATUS FOR SEPARATING GAS AND LIQUID
FRACTIONS FROM PETROLEUM GAS OIL STREAM
Filed Dec. 22, 1958
3 Sheets-Sheet 1
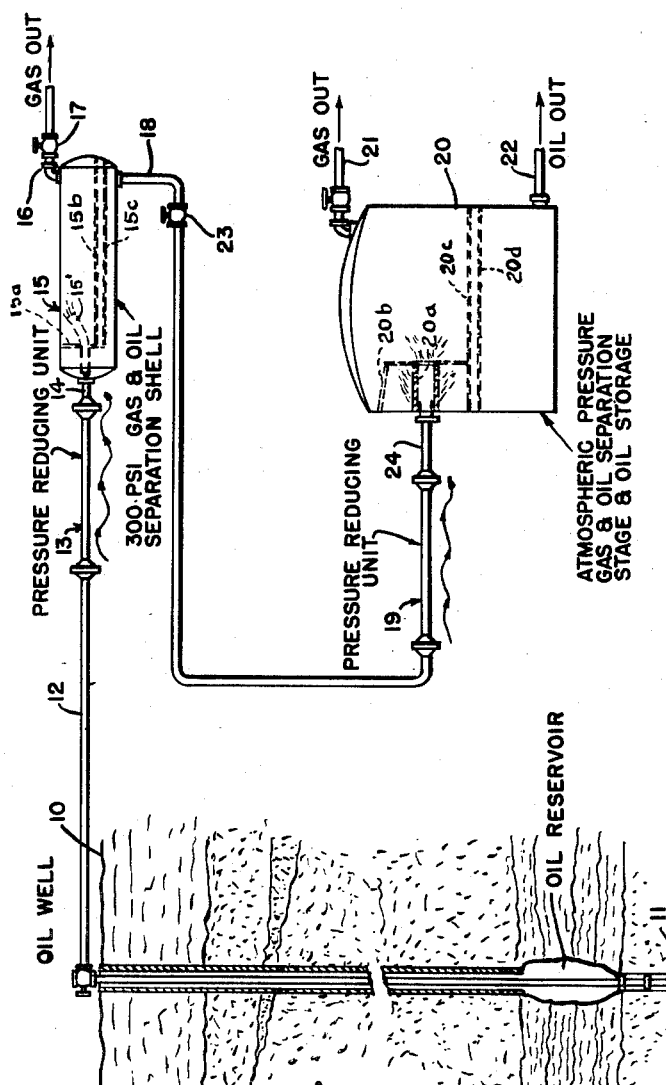
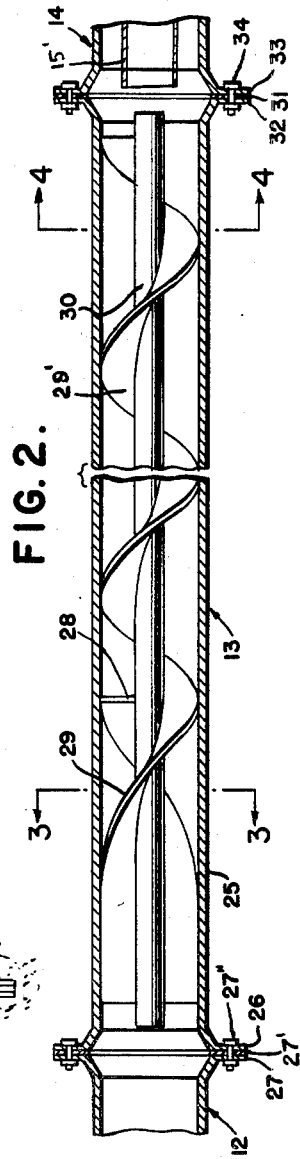
*INVENTOR.*
John J. Sochor
BY *L. S. Saulsbury*
*ATTORNEY*

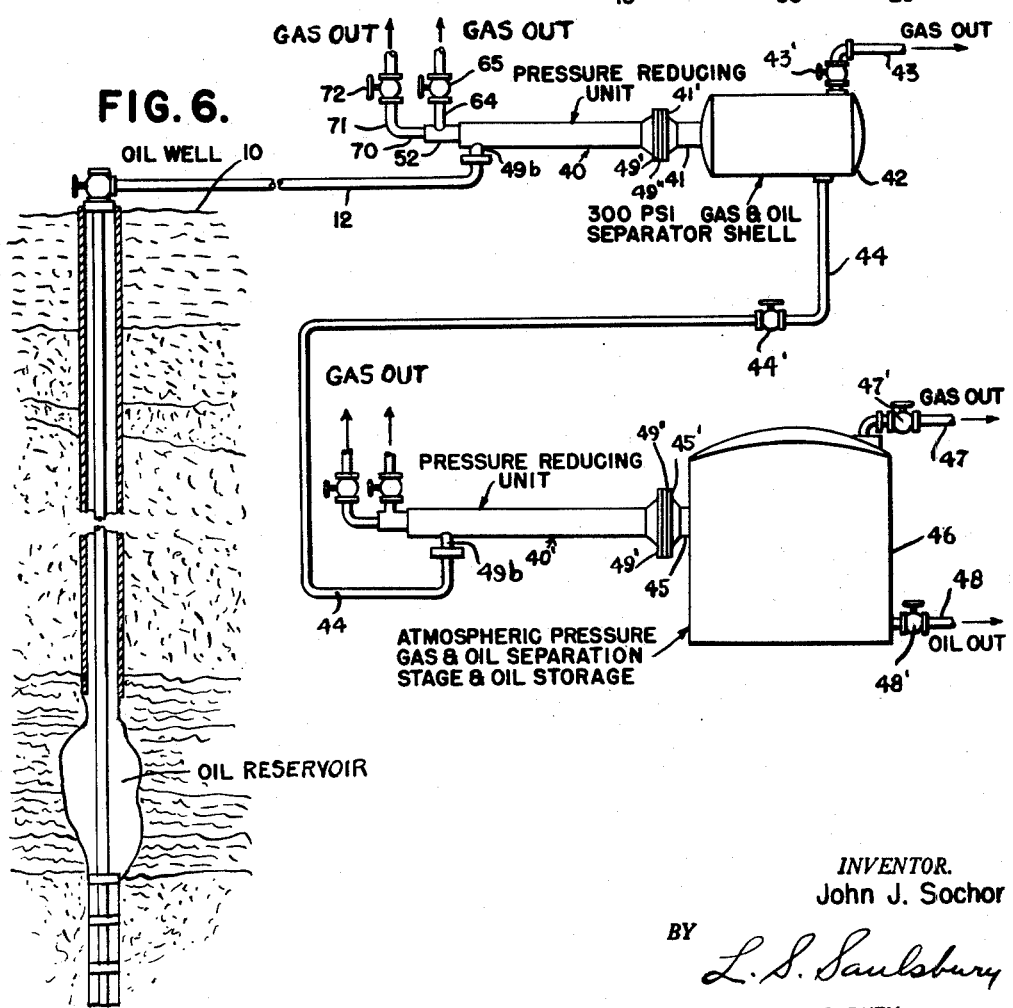

June 21, 1960
J. J. SOCHOR
2,941,619
PROCESS OF AND APPARATUS FOR SEPARATING GAS AND LIQUID
FRACTIONS FROM PETROLEUM GAS OIL STREAM
Filed Dec. 22, 1958
3 Sheets-Sheet 3
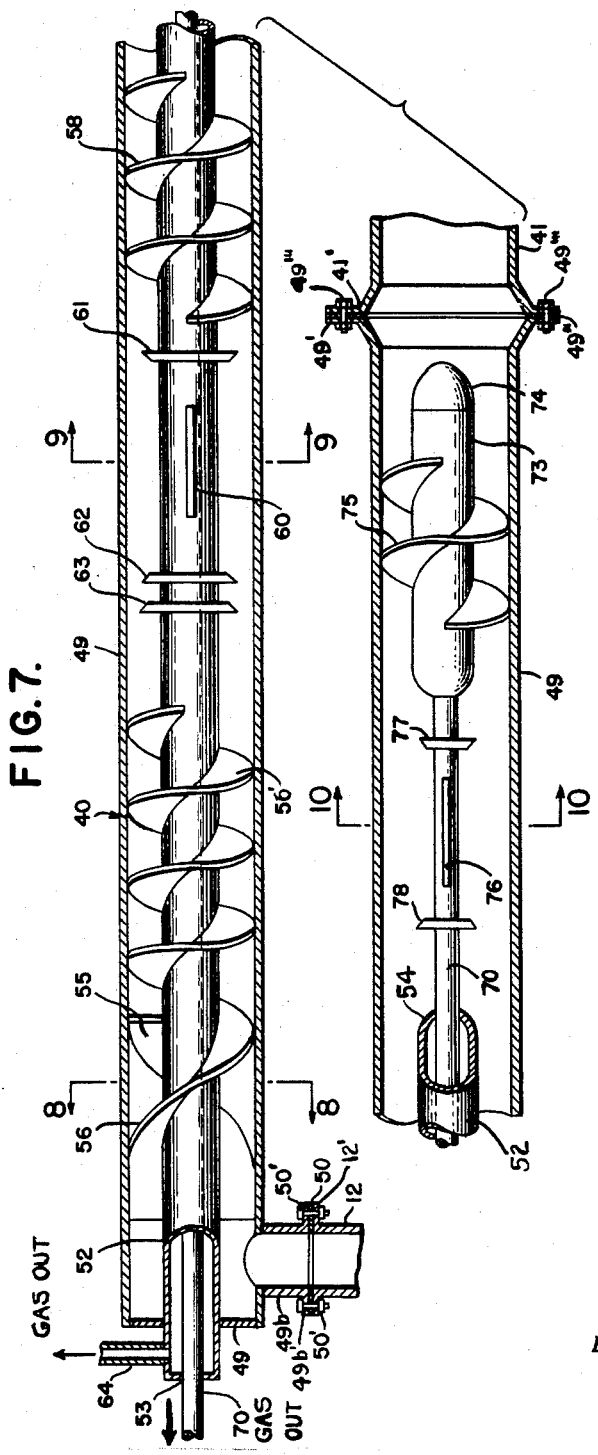
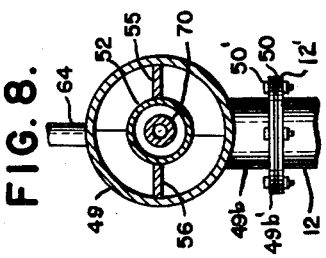
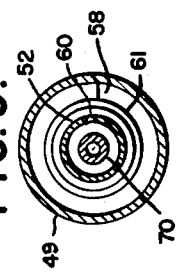
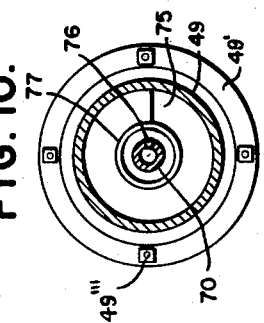
INVENTOR.
John J. Sochor
BY
*L. S. Saulsbury*
ATTORNEY

United States Patent Office 2,941,619
Patented June 21, 1960

2,941,619

PROCESS OF AND APPARATUS FOR SEPARATING GAS AND LIQUID FRACTIONS FROM PETROLEUM GAS OIL STREAM

John J. Sochor, 1414 47th St., Brooklyn, N.Y.

Filed Dec. 22, 1958, Ser. No. 782,200

2 Claims. (Cl. 183—2.7)

This invention relates to a process and an apparatus for separating gas from crude petroleum oil well streams as it is taken from the ground under pressure above atmospheric pressure. This application is a continuation-in-part of application Serial No. 500,185, filed April 8, 1955, now Patent No. 2,865,470.

An object of the present invention is to provide a process of and apparatus for separating gas from crude petroleum oil under pressure above atmospheric pressure in which the gas and liquid constituents will be sharply separated into gas and liquid fractions respectively as the pressure is reduced.

Another object of the present invention is to provide a process of and apparatus for separating gas from crude petroleum oil well streams under pressure above atmospheric pressure in which such fluid is separated into gas and liquid fractions whereby the liquid fraction will contain major part of the low boiling constituent of the butane-hexane range and the gas fraction will contain the small part of this constituent.

A further object of the present invention is to provide a process of and apparatus for treating gas containing fluid under pressure above atmospheric pressure which is positive in action, simple in execution, commercially practical, and more efficient than with previously proposed processes and apparatus.

A still further object of the present invention is to provide an apparatus in which there is provided a unit which causes the gas containing fluid to be separated into gas and liquid fractions while being passed through confined zones, and the withdrawal of the separated gas fractions from the confined zones.

Other objects and advantages of the present invention will become apparent from the following description taken in conjunction with the accompanying drawing, in which:

Figure 1 is a diagrammatic view of the apparatus employed in carrying out the process of the present invention, Fig. 2 is an enlarged sectional view of one of the pressure reducing units of the apparatus of Fig. 1, Fig. 3 is a cross-sectional view of the one reducing unit taken on the line 3—3 of Fig. 2.

Fig. 4 is another cross-sectional view of the one reducing unit taken on the line 4—4 of Fig. 2, Fig. 5 is a fragmentary longitudinal sectional view of the one reducing unit of Fig. 2 illustrating the zone division and the separated fractions in such divisions, Fig. 6 is a diagrammatic view of the apparatus for carrying out the process of the present invention in which the separated gas fractions are withdrawn from the confined zones, Fig. 7 is an enlarged longitudinal sectional view of one of the pressure reducing units of the apparatus of Fig. 6, Fig. 8 is a cross-sectional view of the pressure reducing unit taken on the line 8—8 of Fig. 7, Fig. 9 is a cross-sectional view of the pressure reducing unit taken on the line 9—9 of Fig. 7, and Fig. 10 is a cross-sectional view of the pressure reducing unit taken on the line 10—10 of Fig. 7.

In carrying out the process of this invention, the substance to be treated may be any gas containing fluid under pressure above atmospheric pressure, for example, a condensate or fluid under pressure above atmospheric pressure having either natural or artificial gas associated with or dissolved in the condensate or fluid, or crude petroleum oil as it is received under high pressure at the ground level 10 from well 11. In Fig. 1, the gas-containing fluid under pressure above atmospheric pressure is crude petroleum oil, such oil as it is received at the ground level 10 from the well 11 being caused to flow through a conduit 12 into a pressure reducing unit 13 in which the flowing crude oil is separated into a liquid fraction and a gas fraction. The separated gas and liquid fractions are discharged from the pressure reducing unit 13 into a conduit 14, and are conveyed by the conduit 14 into a confined collection space or closed separation shell 15. The gas fraction is withdrawn from the separation shell 15 through the pipe 16 connected in communication with the top of the shell, the pipe 16 being provided with a valve 17 for controlling the discharge of the gas fraction therefrom. The liquid fraction is withdrawn from the shell 15 through the conduit 18 and is conveyed through the conduit 18 to a second pressure reducing unit 19 in which a further gas fraction is separated from the liquid fraction. The conduit 18 is provided with a valve 23 for controlling therein the flow of the liquid fraction from the separation shell 15. The liquid fraction containing the further gas fraction is discharged from the pressure reducing unit 19 into a second confined collection space or storage receptacle 20 through a pipe 24. The gas fraction is withdrawn from the receptacle 20 through the pipe 21 connected in communication with the top of the receptacle 20, and the liquid fraction is withdrawn from the receptacle 20 through the pipe 22.

The pressure reducing unit 13, Figs. 2, 3 and 4, comprises a tube 25 which has one of its ends provided with a flange 26. The adjacent end of the conduit 12 is likewise provided with a complemental flange 27 which is connected in tight sealing engagement with the flange 26 by means of a gasket 27' and bolt and nut assemblies 27''. The other end of the tube 25 is provided with a flange 32 which is connected in tight sealing engagement to a flange 33 on the adjacent end of the conduit 14 by means of a gasket 31 and bolt and nut assemblies 34. Positioned within and fixedly secured to the tube 25 is a helix 28, the portion of the helix adjacent the flange 26 being of the double type helices 28 and 29 and the helix 29 continuing as a single type helix 29'. The outer peripheries of the respective convolutions of the helices 28 and 29 contact the inner wall of the tube 25. The inner peripheries of the convolutions of the helices contact a central rod 30. The oil entering through the conduit 12 flows around the convolutions of the double type helices 28 and 29 and thence around the convolutions of the single type helix 29' and the central rod 30. As the oil flows from the conduit 12 into the tube 25 this causes the oil to flow in a confined spiral path and as it flows through such path it is subdivided successively into temporary confined zones, the zones being formed in adjacent convolutions of the helix 29'. The confined zones are in turn subjected to both centrifugal force and progressively decreasing pressures between the initial pressure of the crude oil and atmospheric pressure to separate the oil into a liquid fraction and a gas fraction, the centrifugal force being caused by the flow of oil under pressure through the convolutions of the helix and the decreased pressures being caused by the formation of the temporary confined zones. The separation of the oil in adjacent zones into liquid and gas fractions is graphically illustrated in Fig. 5, and showing in such separation a foam between the liquid fraction and the gas fraction.

The pressure reducing unit 19 is of the same structure as that of pressure reducing unit 13, and in this unit 19 the remaining liquid fraction flowing from the conduit 18 is also treated in the same manner as described in connection with the unit 13, namely, in a further spiral path, and being caused while flowing through the further spiral paths to be subdivided successively into temporary confined zones, the zones subjected in turn to both centrifugal force and progressively decreasing pressures between the initial pressure of the liquid fraction and atmospheric pressure to separate a further gas fraction therefrom.

The crude oil as it is received at the ground surface from the well 11 may be of a pressure of from atmospheric to several thousand pounds per square inch and would normally be flowed to the pressure reducing unit 13 at a pressure less than and not exceeding 600 pounds per square inch. In the pressure reducing unit 13 the pressure of the fluid or oil is progressively dropped in the temporary confined zones to an intermediate pressure of, for example, 300 pounds per square inch, depending on the initial pressure of the fluid or oil entering the unit 13, the fluid gas-liquid ratio, and the prevailing marketing conditions for the resultant gas. At this pressure of 300 pounds per square inch, the separated liquid and gas fractions are discharged into the shell 15. The liquid fraction discharged from the vessel 15 is progressively dropped in pressure in the pressure reducing unit 19 to about atmospheric pressure, and the liquid fraction containing the separated further gas fraction being discharged at or near atmospheric pressure into the second collection space or receptacle 20.

By the process of this invention above described, the separated liquid fraction contains most of the low boiling liquid constituents such as the butane-hexane containing constituent with only a small amount of the latter named constituent associated with the separated gas fraction.

It has been found that the thus described process is highly efficient. The separated or extracted liquid fraction will have only a small amount of gas fraction dissolved therein after the withdrawal of the gas fractions from the confined zones. In the showing of Fig. 6, the crude petroleum oil as it is received at the ground level 10 from the well 11 is caused to flow through the conduit 12 into a pressure reducing unit 40 in which the flowing oil is separated into a liquid fraction and a gas fraction with the gas fractions as they are formed in the confined zones being withdrawn therefrom and the separated liquid fraction being discharged from such unit 40 into a confined collection space or closed shell 42 through the conduit 41. The gas fraction is collected in the shell 42 and is withdrawn from the shell 42 through a pipe 43 connected in communication with the top of the shell 42, the pipe being provided with a valve 43' for controlling the discharge of the gas fraction therefrom. The liquid fraction is withdrawn from the shell 42 through the conduit 44 having control valve 44' and is conveyed to a second pressure reducing unit 40' in which a further gas fraction is separated from the liquid fraction with the gas fractions as they are formed in the confined zones being withdrawn therefrom and the separated liquid fraction being discharged therefrom through a conduit 45 into a confined final collection space or storage receptacle 46. The conduit 45 is provided with a valve 45' for controlling therein the flow of the liquid fraction. The gas fraction which is present in the receptacle 46 is withdrawn through a pipe 47 having control valve 47' connected in communication with the top of the receptacle and the liquid fraction is withdrawn from the receptacle 46 through a pipe 48 having control valve 48'.

The pressure reducing units 40 and 40', Figs. 7, 8, 9 and 10, comprise a tube 59 which has one end provided with a flange 49' which is connected in tight sealing engagement with a complementary flange 41' or 45' on the end of the conduit 41 or 45 by means of a gasket 49" and fastening bolts 49"'. The other end of the tube 49 is closed by a closure disc 49a, and adjacent the closure disc 48, the tube 49 is provided with an inlet pipe 49b. The free end of the inlet pipe 49b is provided with a flange 49b' which is connected in tight sealing engagement with a complemental flange 12' on the end of the conduit 12 by means of a gasket 50 and fastening bolts 50'. A pipe 52 is concentrically arranged within the tube 49 and has one end projecting through the closure disc 49a to a point exteriorly thereof and closed by a cap 53. The other end of the pipe 52 is closed by a nose 54, that is spaced inwardly from the flanged end of the tube 49. Surrounding the portion of the pipe 52 and extending inwardly from inlet pipe end of the tube 49 is a short helix 55, and doubled therewith throughout its length is a longer helix 56 that extends beyond the short helix 55 to provide a single helix portion 56'. It is to be noted that the peripheries of the respective convolutions of the helices 55 and 56 closely contact the inner wall of the tube 49, and that the single helix portion 56' of the helix 55 terminates at a point spaced from the inlet pipe 49b not far therefrom but beyond the short helix 55 to the extent of four convolutions.

Surrounding the portion of the pipe 52 just inwardly of the nose 54 thereof and spaced from the helix portion 56' is short helix 58 of the single type with three convolutions, the respective convolutions of the helix 58 closely contacting the inner wall of the tube 49. In the portion of the pipe 52 between the terminating point of the single helix portion 56' and the short helix 58 there is a longitudinally-extending slot 60. On the side of the slot 60 adjacent the helix 58, there is a deflector ring 61 which is fixed to the pipe 52 and on the side of the slot 60 adjacent the terminating point of the single helix portion 56' there are a pair of deflector rings 62 and 63 which are fixed to the pipe 52. The pipe 52 in the portion exteriorly of the closure disc 48 and inwardly of the cap 53 has a discharge conduit 64 in which there is a control valve 65, Fig. 6.

Positioned axially and concentrically within the pipe 52 is another but smaller pipe 70, that projects through the cap 53 and terminates in an elbow turn 71, Fig. 6, and has a control valve 72. The pipe 70 extends through the nose 54 of the pipe 52 up to a point adjacent to and just inwardly of the flanged end of the tube 49. This end of the pipe 70 has a short enlarged tube 73 concentrically arranged thereon and closed at its end by a nose cone 74. The opposite end of the tube 73 is spaced from the nose 54 of the pipe 52. Surrounding the tube 73 of the pipe 70 is a single helix 75 of two convolutions, the respective convolutions of this helix 75 closely contacting the inner wall of the tube 45. In the portion of the pipe 70 between the tube 73 and the nose 54 of the pipe 52 there is a longitudinally-extending slot 76. On the pipe 70 and at the side of the slot 76 adjacent the tube 73, there is a deflector ring 77 and at the side of the slot 76 adjacent the nose 54 of the pipe 52, there is a deflector ring 78.

The oil entering the tube 49 of the pressure unit 40 through the inlet pipe 49b from the conduit 12 flows around the convolutions of the double helices 55 and 56, thence around the convolutions of the single helix portion 56', thence into the space between the single helix portion 56' and the helix 58 and around the helix 58, thence into the space between the helix 58 and the helix 75 and finally around the helix 75 and into the conduit 41 or 45. The flow of the oil through the convolutions of the respective helices 55, 56—56', 58 and 75 causes the oil to flow in a confined spiral path and as it flows through such path it is subdivided successively into concentric zones, the zones being formed within the adjacent convolutions of the aforesaid helices. The confined zones are in turn subjected to both centrifugal force and progressively decreasing pressures between the initial pressure of the crude oil and atmospheric pressure to separate the oil into a liquid fraction and a gas fraction, the centrifugal force being caused by the flow of oil under pressure through the convolutions of the helices 55, 56—56', 58 and 75 and the decreased pressures being caused by the formation of the temporary confined zones. As the separated liquid and gas fractions flow trough the space between helix portion 56' and helix 58 the gas fraction is caused to flow through the slot 60 into the pipe 52 and thence through the discharge conduit 64, the deflector rings 61, 62 and 63, acting to restrict droplets of the liquid fraction from entering the slot 60. Also, when the separated liquid and gas fractions flow through the space between the helix 58 and helix 75, the gas fraction is caused to flow through the slot 76 into the pipe 70 and through the elbow 71, the liquid fraction with most of the gas fraction removed being discharged into the shell 42 through the conduit 41. The deflector rings 77 and 78 act in like manner as do the deflector rings 61, 62, and 63 in restraining droplets of liquid fraction from entering the slot 76. The deflector rings reduce the carry over of the liquid fraction from the confined zones into the slots of the gas draw off pipes 52 and 70. Any film creeping along the gas draw off pipes will be disrupted by the sharp edges of the deflector rings and the centrifugal action upon the film.

The unit 40' is of the same structure as that of unit 40, and in this unit the liquid fraction flowing from the conduit 44 is also treated in the same manner as described in connection with the unit 40, namely, caused to flow in further spiral paths, caused while flowing through the further spiral paths to be subdivided successively into temporary confined zones, the zones subjected in turn to both centrifugal force and progressively decreasing pressures between the initial pressure of the liquid fraction and atmospheric pressure to separate a further gas fraction therefrom with the gas fractions being withdrawn from the confined zones as they are formed.

The gas and liquid fraction entering the separators 15 and 42 from the pipe 14 or 41 passes thereinto with the gas at the center and with the liquid fraction spiraling outwardly into the separator. A bent up pipe 15' may be disposed in the center of the pipe 14 so that the gas from the center will be separated and led to the top of the separator 15 to thereby prevent it from recontacting as much as possible the liquid. A vertical plate 15a will serve to stop the external centrifugal liquid fraction flow from entering the gas space and be directed into the bottom of the separator where it is kept from further contact with the gas space by overlying longitudinally extending perforated plates 15b and 15c.

In the second separator 20 or 46 there is provided a wire mesh sleeve 20a at the inlet of the liquid fraction flow into the separator plate supported on the end of the unit pipe 24 through which the liquid fraction is directed as it spirals out of the inlet leaving the gas fraction to pass beyond and into the gas space of the separator. A hood 20b extends about the outer end of the mesh and over the top thereof to cause the oil passing through the mesh to be stopped and directed into the bottom of the separator where it is collected and kept from further contact with the gas space by overlying perforated plates 20c and 20d.

What is claimed is:
1. In an apparatus for treating gas-containing fluid, a pressure reducing unit comprising a tube having one end closed and the other end open, said tube having an inlet adjacent the closed one end thereof, a pipe extending axially and concentrically arranged within said tube and having a portion adjacent one end extending through and supported in the closed end of said tube and extending exteriorly thereof, the other end of said pipe being closed and spaced from the other open end of said tube, a helix surrounding said pipe inwardly of and adjacent the closed end of said tube with the peripheries of the convolutions of said helix closely contacting the inner wall of said tube, a second helix surrounding said pipe inwardly of and adjacent the closed other end of said pipe with the peripheries of the convolutions of said helix closely contacting the inner wall of said tube, said second helix being spaced from said first-mentioned helix, means in the portion of said pipe between said first and second helices connecting the space between said pipe and tube in communication with the interior of said pipe, said pipe having an outlet exteriorly of the closed end of said tube, means on the open end of said tube for connection to a collection space, a second pipe extending axially through said first named pipe and extending through and supported in said one closed end of said first named pipe, said second pipe also extending through the closed end of said first named pipe with its other end adjacent to and inwardly of the open end of said tube, the other end of said second pipe being closed, a third helix surrounding said second pipe adjacent the closed other end thereof with the peripheries of the convolutions of said third helix closely contacting the inner wall of said tube, said third helix being spaced from the other closed end of said first named pipe, and means in the portion of said second pipe between its closed other end and said closed end of said first named pipe connecting the interior of said tube with the interior of said second pipe.

2. In an apparatus for treating gas-containing fluid, a pressure reducing unit comprising a tube having one end closed and the other end open, said tube having an inlet adjacent the closed one end thereof, a pipe extending axially through said tube and having one end extending through and supported in the closed end of said tube and extending exteriorly thereof, said one end of said pipe being closed, the other end of said pipe being closed and spaced from the other open end of said tube, a helix surrounding said pipe inwardly of and adjacent the closed end of said tube with the peripheries of the convolutions of said helix closely contacting the inner wall of said tube, a second helix surrounding said pipe inwardly of and adjacent the closed other end of said pipe with the peripheries of the convolutions of said helix closely contacting the inner wall of said tube, said second helix being spaced from said first mentioned helix, said pipe having a slot between said first and second helices to connect the space between said pipe and tube with the interior of said pipe, said pipe having an outlet exteriorly of the closed end of said tube, means on the open end of said tube for connection to a collection space, a second pipe extending axially through said first named pipe and having one end extending through and supported in said one closed end of said first named pipe, said second pipe also extending through the other closed end of said first named pipe with its other end lying adjacent to and inwardly of the open end of said tube, the other end of said second pipe being closed, a third helix surrounding the said second pipe adjacent the closed other end thereof with the peripheries of the convolutions of said helix closely contacting the inner wall of said tube, said third helix upon the second pipe being spaced from the other closed end of said first named pipe, said first and second pipes respectively having slots between the helices thereof connecting the interior of said tube with the interior of the respective first and second pipes through which the separated gas fraction may be exhausted and deflector rings on opposite sides of the respective slots of said first and second pipes and fixedly carried by said first and second pipes respectively.

References Cited in the file of this patent

UNITED STATES PATENTS

| | | |
|---|---|---|
| 1,595,268 | Van Petten et al. | Aug. 10, 1926 |
| 2,147,671 | Pratt | Feb. 21, 1939 |
| 2,865,470 | Sochor | Dec. 23, 1958 |